(12) United States Patent
Sahlgren et al.

(10) Patent No.: US 10,908,073 B2
(45) Date of Patent: *Feb. 2, 2021

(54) HIGH THROUGHPUT BIOCHEMICAL SCREENING

(71) Applicant: Single Technologies AB, Stockholm (SE)

(72) Inventors: Bengt Sahlgren, Saltsjö-Boo (SE); Raoul Stubbe, Stocksund (SE); Johan Strömqvist, Stockholm (SE)

(73) Assignee: SINGLE TECHNOLOGIES AB, Stockholm (SE)

( * ) Notice: Subject to any disclaimer, the term of this patent is extended or adjusted under 35 U.S.C. 154(b) by 249 days.

This patent is subject to a terminal disclaimer.

(21) Appl. No.: 15/507,718

(22) PCT Filed: Aug. 27, 2015

(86) PCT No.: PCT/EP2015/069656
§ 371 (c)(1),
(2) Date: Feb. 28, 2017

(87) PCT Pub. No.: WO2016/030464
PCT Pub. Date: Mar. 3, 2016

(65) Prior Publication Data
US 2017/0292907 A1     Oct. 12, 2017

(30) Foreign Application Priority Data
Aug. 28, 2014   (SE) ........................... 1450997

(51) Int. Cl.
*G01N 21/25*    (2006.01)
*G01N 21/64*    (2006.01)
(Continued)

(52) U.S. Cl.
CPC ....... *G01N 21/253* (2013.01); *G01N 21/6452* (2013.01); *G02B 21/36* (2013.01);
(Continued)

(58) Field of Classification Search
CPC .. G01N 21/253; G01N 21/6452; G01N 35/02; G02B 21/36; G02B 21/367; G02B 21/00
See application file for complete search history.

(56) References Cited

U.S. PATENT DOCUMENTS

| 4,338,279 A | 7/1982 | Orimo |
| 4,940,332 A | 7/1990 | Miwa |

(Continued)

FOREIGN PATENT DOCUMENTS

| JP | 2010-281660   | 12/2010 |
| JP | 2011-153944 A | 8/2011  |

(Continued)

OTHER PUBLICATIONS

International Search Report, dated Feb. 1, 2016, in International Application No. PCT/EP2015/069656.
(Continued)

*Primary Examiner* — Maris R Kessel
*Assistant Examiner* — Joshua L Allen
(74) *Attorney, Agent, or Firm* — Knobbe, Martens, Olson & Bear, LLP (57) ABSTRACT

A method and apparatus are provided, in which an observation volume is defined by a volume where light from illumination means and a field of view of detection means overlap. The central axes of said light from the illumination means and said field of view of the detection means are non-parallel, and the sample is transported through the observation volume during imaging, preferably by rotation of a sample container holding the sample.

25 Claims, 3 Drawing Sheets

(51) Int. Cl.
*G02B 21/36* (2006.01)
*G01N 35/02* (2006.01)
*G02B 21/00* (2006.01)

(52) U.S. Cl.
CPC ........... *G02B 21/367* (2013.01); *G01N 35/02* (2013.01); *G02B 21/00* (2013.01)

(56) References Cited

U.S. PATENT DOCUMENTS

| | | | | |
|---|---|---|---|---|
| 6,278,518 | B1* | 8/2001 | Schrof | G01N 15/04 |
| | | | | 356/318 |
| 6,388,742 | B1 | 5/2002 | Wardlaw | |
| 6,444,992 | B1 | 9/2002 | Kauvar | |
| 7,738,945 | B2* | 6/2010 | Fauver | G01N 15/1468 |
| | | | | 356/444 |
| 7,973,294 | B2 | 7/2011 | Gratton | |
| 2003/0017081 | A1* | 1/2003 | Trulson | G01N 21/6428 |
| | | | | 422/400 |
| 2004/0115093 | A1* | 6/2004 | Wang | G01N 21/253 |
| | | | | 422/400 |
| 2005/0264805 | A1* | 12/2005 | Cromwell | G01N 21/253 |
| | | | | 356/246 |
| 2006/0223172 | A1* | 10/2006 | Bedingham | G01J 3/4406 |
| | | | | 435/288.7 |
| 2009/0017553 | A1* | 1/2009 | Hoying | G01N 21/6428 |
| | | | | 436/172 |
| 2010/0067003 | A1 | 3/2010 | Marcu | |
| 2010/0075863 | A1 | 3/2010 | Lesho | |
| 2010/0078576 | A1* | 4/2010 | Ntziachristos | A61B 5/0073 |
| | | | | 250/459.1 |
| 2012/0002190 | A1* | 1/2012 | Laitinen | G01N 21/6452 |
| | | | | 356/32 |
| 2012/0053068 | A1 | 3/2012 | Remacle | |
| 2015/0160354 | A1* | 6/2015 | Mertens | G01N 23/046 |
| | | | | 378/9 |
| 2016/0231547 | A1* | 8/2016 | Kubo | G02B 21/0064 |

FOREIGN PATENT DOCUMENTS

| | | |
|---|---|---|
| JP | 2012-008077 | 1/2012 |
| WO | WO 2005/038053 A1 | 4/2005 |
| WO | WO 2007/091530 | 8/2007 |
| WO | WO 2013/164103 | 11/2013 |
| WO | WO 2014/034275 | 3/2014 |

OTHER PUBLICATIONS

Written Opinion, dated Feb. 1, 2016, in International Application No. PCT/EP2015/069656.

Translation of Notice of Reason for Rejection, dated May 28, 2019, in Japanese Patent Application No. 2017-530427.

Concise explanation dated Apr. 25, 2019 of the relevance of an Office Action received in Chinese Patent Application No. 2015800511885.

* cited by examiner

HIGH THROUGHPUT BIOCHEMICAL SCREENING

PRIORITY AND CROSS REFERENCE TO RELATED APPLICATIONS

This application is the U.S. National Stage Application under 35 U.S.C. § 371 of International Application No. PCT/EP2015/069656, filed Aug. 27 2015, designating the U.S., and published as WO 2016/030464 A1 on Mar. 3, 2016, which claims the benefit of Swedish Patent Application No. 1450997-0, filed Aug. 28, 2014.

TECHNICAL FIELD

The present invention provides methods and apparatus to detect, monitor, image, and retrieve data from primarily organic matter, but not excluding inorganic matter, and from chemical, biochemical, or biological reactions, interactions, pathways or sequences in this matter. In particular the invention provides methods and devices to study the said matter with high spatial resolution in three dimensions with high throughput and at a lower cost per sample, e.g. in living cells, in living tissue, and in solutions containing organic matter. A further application specifically targeted is the possibility to monitor DNA and RNA related activities in living cells or in solution.

BACKGROUND

There is a plethora of methods and devices to image biological samples. Predominantly, these are variations of confocal microscopy patented by Marvin Minsky in the late nineteen fifties. The popularity of confocal microscopy is due to its sectioning capability that enables comparably high resolution in three dimensions and better contrast than can be accomplished with conventional wide-field microscopy. Very often, confocal microscopy is combined with fluorescence spectroscopy, where specific particles, e.g. proteins, are marked with fluorophores and thus can be discerned from the background.

In most confocal microscopes, the same optics (at least the same objective lens) is used both for the illuminating/exciting and for viewing/detecting the light from the sample under study. An advantage of this configuration is that it mimics the design of the classical wide field microscope and therefore more or less the same optical components can be used. Another advantage is that the illumination and detection are automatically aligned. A further advantage is that by illuminating and viewing with the field of view axis perpendicular to the sample surface, the N.A can be large without running into problems such as total reflection.

However, this geometry of conventional confocal microscopy introduces weaknesses and trade-offs that limit the spectrum of applications that can be addressed.

In confocal microscopy, the resolution, i.e. the distance between two distinguishable radiation points, is obtained by limiting the volume (the observation volume) from which emitted light is allowed to reach the detector. Limiting the observation volume is accomplished by combining two approaches: (i) In the dimension orthogonal to the illumination (or equivalent the field of view) axis of the microscope, the extension of observation volume is determined by the focal width in the focal plane of the objective lens; and (ii) in the dimension along the illumination axis (the field of view axis) of the objective lens, the observation volume is determined by the width of a pinhole placed in the optical conjugate plane in front of the detector. This pinhole is made small enough to block all light emanating from points that are outside a certain distance from the focal plane along the direction of the illumination axis. This way, by choosing an objective lens with very small focal width and a small and correctly positioned pinhole, a very high resolution in all three dimensions can be obtained. A further advantage of using the pinhole is that it enhances the contrast since the scattered or fluorescent light emanating from illuminated parts of the sample that are outside the observation volume never reaches the detector.

Nonetheless, in practice this implies several trade-offs:

First, the focal width is determined by the numerical aperture (N.A.) of the objective lens. It is thus desirable to have a really high N.A. to obtain a high resolution. However, for high N.A objectives that have a long working distance (to be able to penetrate the full depth of the sample) and work for a broad spectrum, compensating for the chromatic aberration for both the exiting light and the detected light (in fluorescence spectroscopy this can be several 100 nm) is very expensive.

Second, the pinhole used for filtering out the light emanating from outside the focal plane makes it impossible to image more than one point in the focal plane at the time. Thus, to obtain an image one has to move (scan) the sample and the observation volume relative to each other. The image is synthesized dot by dot and a 1024×1024 frame may take well over a second to acquire. This complicates the possibility to parallelize the imaging and thus to achieve a high throughput.

As mentioned above, the observation volume in conventional confocal microscopy is determined by combining a small focal width with the pin-hole technique. Another way to create an observation volume in three-dimensional space is to use, so called, confocal theta microscopy, see Stelzer, E H K, et al. "Fundamental reduction in the observation volume in far-field light microscopy by detection orthogonal to the illumination axis: confocal theta microscopy", Opt Commun. 111, 536-547, (1994). In this technique, the observation volume is instead determined by the use of two objective lenses that are placed such that the axes of their fields of view are orthogonal and that their focal planes intersect. The observation volume is thus limited by the focal width of one detector in one direction and by the focal width of the second detector in an orthogonal second direction. The illumination in this case can be arbitrary as long as it illuminates the observation volume under interest.

From an observation volume perspective, theta confocal microscopy removes the need for a pinhole. However, from a contrast perspective the pinhole is needed to suppress light emanating from outside the observation volume that reaches either of the detectors.

Since confocal microscopes are essentially point-by-point measuring devices, an image of a sample is formed by moving the sample volume, containing whatever sample under study, relative to the observation volume, defined by the objective lens of the microscope and the pinhole in front of the detector, and measuring a value of the intensity for each point. The motion continues until an entire two-dimensional (x-y) image has been acquired, a process that can be repeated to generate a series of images over time. Alternatively, the observation volume can also be stepped along the microscope axis to acquire a three-dimensional (x, y, and z) image stack of optical sections. With this vector of values, an image in three dimensions can be synthesized and is typically tomographically displayed on a screen.

In early versions of confocal microscopes, the sample is placed on a high-precision translation stage that moves the sample systematically in three dimensions until the image vector has been generated. In order to create a high frame rate, the sample has to be moved along its pre-programmed path at high speed while maintaining sub-micrometer precision. This is a challenging and expensive task due to the high accelerations of the mass of the sample holder and the stages. It has also been difficult to maintain focus across large areas, and comparatively complicated auto focus systems have been implemented for this purpose.

Gratton et al. (U.S. Pat. No. 7,973,294) have proposed another solution to move the sample volume through the observation volume. Instead of having an x-y-z translation stage moving around the sample volume, the sample is placed in a container that is rotating. Thus, a very large sample volume can be passed through the observation volume of the confocal microscope with a minimum of acceleration required. When in steady state, only the friction of the rotation stage has to be overcome and the container can also be slowly moved in other directions in order to access all parts of the sample volume. However, this setup was not intended for imaging, but rather for spectroscopic measurements.

Another approach to attain a high frame rate is laser scanning confocal microscope. Instead of moving the sample, the excitation light beam is expanded and directed to a pair of oscillating galvanometer scanning mirrors that raster-scan the focused beam across the sample volume. The light from the sample is de-scanned through the same mirror set and passed through a conjugate (confocal) pinhole before reaching the detector. The scanning speed is limited by the mechanical specifications of the fastest mirror, which typically scans at a rate of approximately 4 to 5 microseconds per image point (sometimes referred to as a pixel or in three-dimensional space a voxel). Thus, for a 512×512 pixel image collected in a single second, the scanning spot dwells on each pixel for about 4 microseconds. Again, obtaining higher rates is very difficult, if not impossible, due to the fact that the mirror would have to be rapidly accelerated, held at a constant velocity while scanning across the field, then rapidly decelerated and the direction of travel reversed, repeating this cycle for each scanned line.

Although limitations in scanning speed can be improved by employing resonant scanning schemes, such high speed acquisitions suffer from another problem: the so called dwell time gets very short. The dwell time is here defined as the time that the same part of a sample (specimen) "dwells" within an illuminated part of the observation volume. Especially if fluorescence imaging is involved then a fast scanning confocal microscope may suffer from an insufficient signal-to-noise ratio.

Another alternative for fast scanning of samples is the (Nipkow) spinning disk method. This confocal microscope is based on a circular, rotating disk that has one or more pinhole arrays that are arranged in a spiral pattern designed to cover the sample volume during one revolution of the disk. Since no accelerations are needed other that rotating the disc, this configuration is mechanically very stable in steady state. Another advantage with this method is that despite the pinholes of the spinning disk several points (pixels) can be view in parallel. Combining the high speed and the ability to parallelize very high frame rates have been accomplished by using this technique exceeding 1000 frames per second. Yet, Spinning disk confocal microscopes are not without their artifacts. One limitation is that light, scattered or emitted, from outside the focal plane can reach the detector by traveling through adjacent pinholes, so called pinhole crosstalk. A second limitation is the low percentage of light (often less than 10%) passing through the pinholes of the disk. The remainder of the light is reflected and may show up as background noise in the detector. Both these side effects limit the signal to noise ratio. Perhaps the biggest disadvantage though is the complexity of the instruments of this kind which makes the cost of instruments based on this method prohibitive in many applications.

Hence, although the prior art has taken steps towards improving apparatus for micro imaging, there are still considerable difficulties in reaching high resolution and throughput at a commercially viable cost.

SUMMARY

Therefore, an important goal of the present invention is to enable studies, tests, etc. of primarily micro-biologically relevant matter, with a high frame rate and high spatial resolution in three dimensions at a cost level that allows this method and apparatus based on the invention to make the transition from well-funded research labs to much more general usage in e.g. point-of care applications.

According to the present invention, the above goals are met by a novel combination of how the sample volume is transported through the observation volume and how said observation volume is defined, and how the light emitted or scattered from the observation volume is detected.

First, in embodiments of the present invention, the observation volume is defined in a way akin to theta confocal microscopy but with the very important difference that the observation volume is determined by the focal width of the illumination/exiting light and the focal width of the field of view of the objective lens of the detection means. The focal plane of the illumination/exiting light and the focal plane of the objective lens are intersecting and the axes of the illumination/exciting light and the objective lens are chosen to be preferably orthogonal but at least significantly non parallel. This configuration removes the need for a pin-hole, since the detector only receives light from the section of the field of view of the detection means that is illuminated. Without the pinhole in front of the detector, it is possible to view several points at the time in the plane illuminated by the illumination/exciting means. In a preferred embodiment, the optics of the illumination means is chosen such that the illumination is a line focus, thus forming an illuminated plane with a normal vector preferably parallel with the axis of the field of view of the detection means. In this way, the detection means can be devised such that it views a number of points (pixels or in three dimensional space, voxels) in the illumination plane in parallel. This corresponds to an x-y frame in conventional confocal microscopy.

Second, the sample or specimen under investigation is placed in a sample container, attached to or integrated with sample container holding means, which in turn is coupled to rotation generating means such that the sample rotates and is made to pass the observation volume defined in accordance with the above paragraph. This is similar to the rotating sample holder proposed by Gratton et al, Spaulding, Harufumi (U.S. Pat. No. 4,940,332 A), but the method and apparatus of the present invention differ in most other aspects. Another very important function of the rotation of the sample volume, besides passing the sample through the observation volume, is to subject the sample a sufficient centrifugal force to keep the sample fixed in a mechanical equilibrium against an inner surface in the sample holder.

Third, the axis of the field of view of the objective lens of and the motion vector of the sample volume (due to the rotation) are chosen to be non-perpendicular, preferably they have an angle of 45 degrees. If the detection means comprises means to view a plane of illuminated voxels, as mentioned above, the motion of the sample volume will move the sample through the plane of voxels and as a function of time sectionalize the sample enabling the generation of an image stack. This corresponds to the stepping in the z-direction in conventional microscopy described earlier.

The present invention thus provides apparatus according to claim 1, as well as a method according to claim 10. Preferred implementations of the invention are outlined in the dependent claims.

BRIEF DESCRIPTION OF THE DRAWINGS

In the detailed description that follows below, reference will be made to the accompanying drawings, on which FIG. 1 schematically shows the general set-up of apparatus according to embodiments of the invention.

DETAILED DESCRIPTION

As outlined above, the sample is made pass through the observation volume by means of rotation. This arrangement serves to accomplish several expedient properties of embodiments according to the invention. Once the sample container has been brought to the desired rotation rate and this rate is kept constant, the only forces acting on the sample are the centrifugal force and the normal forces acting on the sample by the inner walls of the sample container. The sample can also be held to the sample container by chemical binding or adhesion, such that no lid is required. The sample is thus kept in a state of mechanical equilibrium in a controlled position. Further, rotation as a means of motion is advantageous in terms of precision, and facilitates reaching the full potential of the present invention. By using state of the art air-bearing technology and by carefully balancing the sample holding and sample containing means, a sufficiently controlled trajectory of the sample can be accomplished. In steady state, i.e. at constant rotation rate, the position of the sample container holding means when passing through the observation volume can be controlled well within the size of a single voxel, i.e. in the order of half a wavelength of the detected light.

Figure 1:
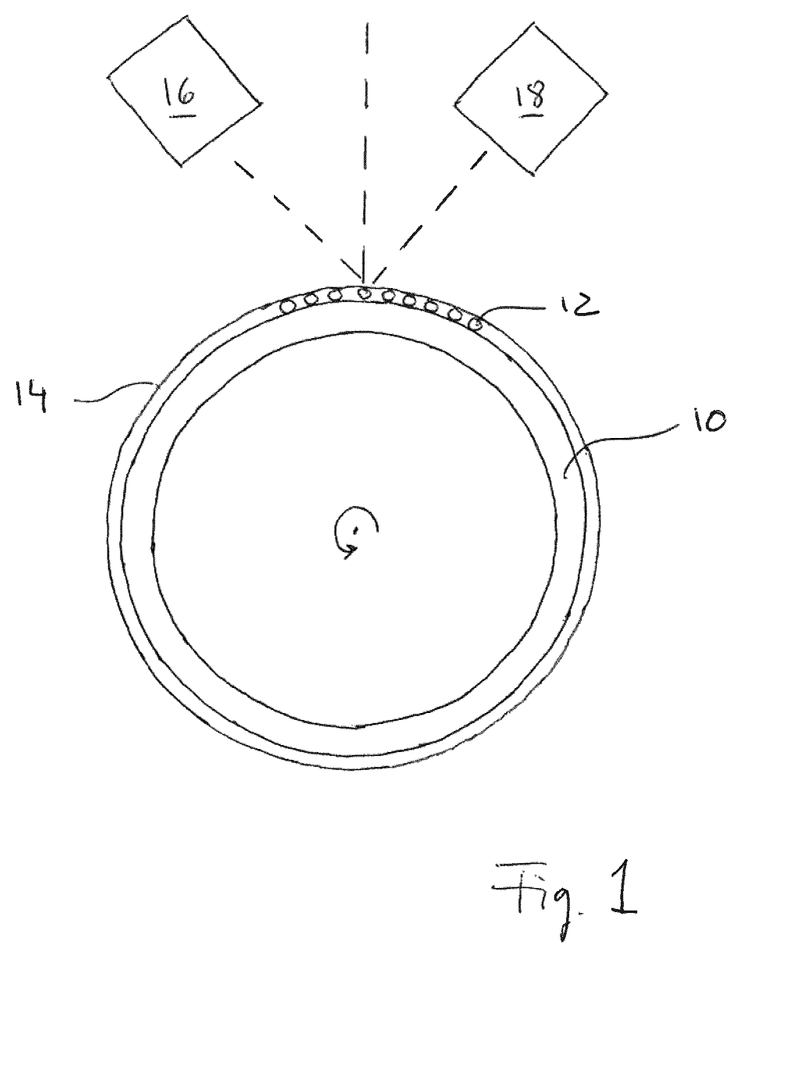

FIG. 1 schematically shows a set-up according to the invention, in which samples are provided in sample containers on a rotatable sample container holder. In FIG. 1, the holder 10 is illustrated as a hollow cylinder, on which samples 12 are present. A cylindrical lid 14 is placed over the holder to define the sample containers, and the samples are kept in place during rotation due to the centrifugal force ensuring that the samples remain steady in place against the lid 14. In the Figure, the samples are illustrated as small circles 12, and in order not to overly complicate the Figure only a few samples are shown; it should be understood however that the entire periphery of the sample container holder will or may typically be occupied by samples. In order to probe the samples, there are provided illumination means 16 and detection means 18. The illumination means 16 may preferably be one or more lasers, such as diode lasers. The detection means 18 may preferably be a single-photon counting detector.

In a preferred embodiment of the invention, the rotation of the sample container holding means is accomplished by the following arrangement: A rotation generating means, typically an electrical brushless DC motor, transmits the angular momentum of its rotor shaft, preferably through inductive forces, to the sample container holding means bringing said sample container holding means to rotate with the same rate. The sample container holding means, preferably made of metal such as aluminum or steel or possibly of a plastic material, is ideally a hollow or solid cylinder, i.e. a tube or a rod. In order to enable a smooth and precise rotation, it is preferred that said sample container holding means is designed and manufactured such that it is symmetrical around an axis along its length and that the mass is evenly distributed in all radial directions from the axis. Also to insure a smooth and repeatable rotation around its axis, the rotating sample container holding means is kept in position by a bearing, preferably an air bearing or an electrodynamic bearing to realize a contactless suspension, said bearing being assembled between said rotating sample container holding means and an inner or outer fixed fitting. A part of the sample container holding means extends outside the fitting, making the same accessible to manual or automated attachment of the sample container.

A sample container can be designed in a plethora of ways. However, to benefit to the goals of the present invention the sample container should ideally be easily attached with the sample container holding means, be shaped in a way that does not significantly offset the center of gravity of the combined sample container holding means and sample container, be optically transparent, be chemically inert, provide protection of the samples or specimens, and be compatible with the standard procedures of the assays of the industry.

Figure 2:
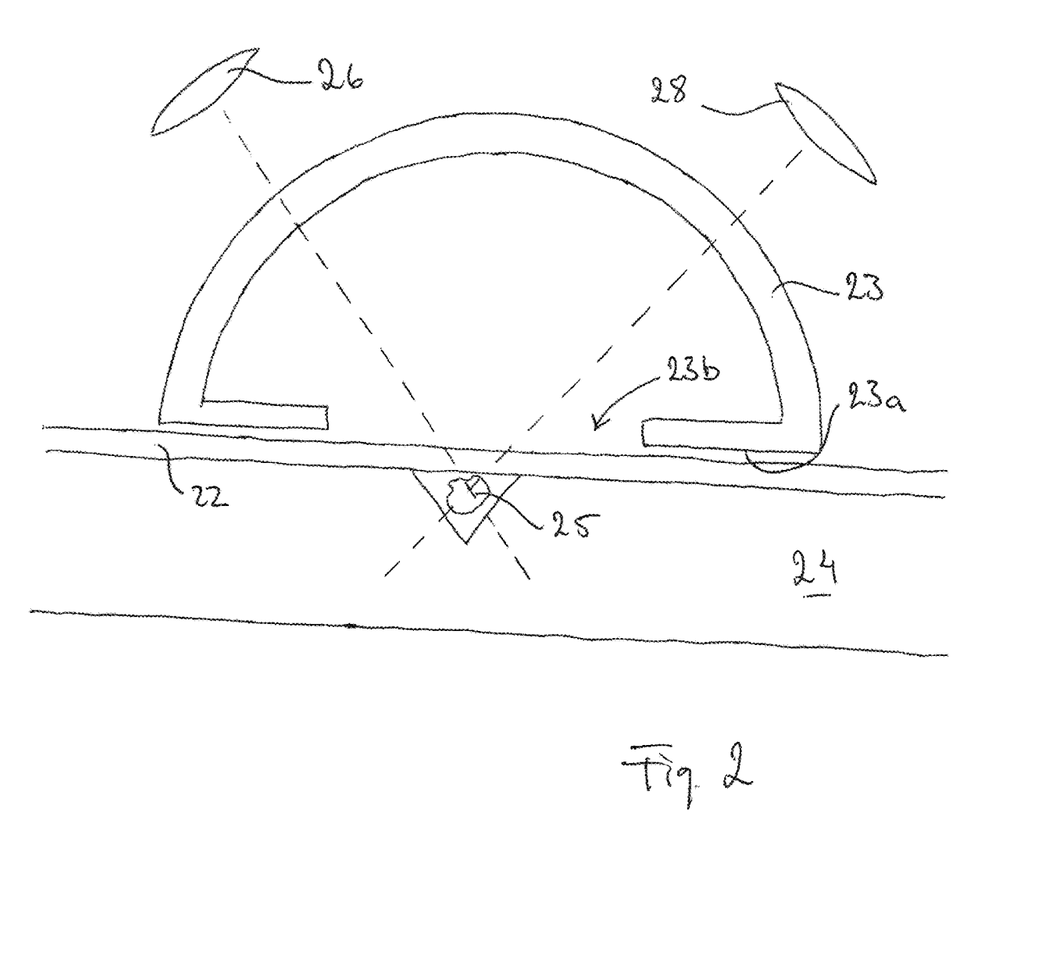
FIG. 2 schematically shows a magnified view of an inventive arrangement for probing a sample.

In the following, general reference will be made to FIG. 2. In one embodiment of the invention the sample container comprises a plate-like means 24 of glass, polymer or silica with a very high flatness. The thickness of said plate-like means is chosen such that it, without running the risk of breaking, can be bent to the same radius as the outer surface of at least a part of the sample container holding means. One side of the plate-like means 24 may be equipped with a pattern of wells, grooves, ridges or similar where samples or specimens 25 could be fitted. On said plate-like means 24, an optically transparent thin plate or film 22, preferably of an inert polymer, is attached as a lid on the patterned side of the plate-like means to enclose and protect the samples or specimens 25 that have been placed on the same. Another function of the lid is to serve as the outermost layer providing the normal forces on the sample when the sample is pushed outwards by the centrifugal forces due to rotation. A third function of the polymer lid is to minimize reflections between the samples or specimens and the sample holding means. In a preferred embodiment, the lid is made from a material having a refractive index close to the refractive index of water ($\approx 1.33$), e.g. Cytop.

It is a goal of the invention to obtain high spatial resolution in order to be able to study very minute details. In the embodiment outlined above, two factors determine the spatial resolution. In the dimension of the focal plane of the objective lens it is the resolving power of that lens that determines the theoretical resolution. The resolving power is in turn determined by numerical aperture and the optical wavelength according to R.P.=$\lambda/2$ NA. As long as the detection means is able to distinguish between these two points, this will also be the practical resolving power. In the dimension defined by the illumination, the same formula holds if the source is a point source such as a single mode laser or a single mode fiber. The minimum volume of a voxel is thus approximately determined by the third power of the resolving power.

From the above it is obvious that a large numerical aperture of both the illumination means 26 and the detection means 28 is required to obtain high resolution imaging. A further advantage of a large N.A. is that it increases capability of the detection means 28 to capture light scattered or emitted from the sample 25 under investigation. Considering the low levels of light that may need to be detected, especially in fluorescence spectroscopy applications, this is crucially important. A high N.A, however introduces a challenge since this entails that light entering from the illumination means 26 into the sample volume 25 and light scattered or emitted from the sample volume 25 needs to be able to do so at large angles relative to the normal vector of the surface of the rotating sample holder. This means that, unless coupling is somehow alleviated, light will be lost due to reflection.

In one embodiment of the invention, means are thus introduced to facilitate the coupling of light to and from the sample container at large angles. This is accomplished by placing at least one coupling means in optical contact with the rotating sample container holding means. The coupling means typically does not rotate with the sample container holding means but is preferably fixed to the detection means and/or the illumination means. By optical contact in this regard it is meant that a surface of the coupling means is either close enough to the surface of the sample container to allow for evanescent coupling of light between the coupling means and the sample container, or that a sufficient amount of liquid with a refractive index at least as high the refractive index of the sample (i.e. about the refractive index of water) is maintained between and in contact with the sample container and the coupling means. On the opposite side the coupling means, the surface is designed generally convex or as a prism such that the light is passing the surface as close to the normal vector of that surface as possible. In a preferred embodiment, this coupling means comprises a half-sphere shaped coupling prism 23. The spherical shape allows for light to enter the prism in any direction and thus the detection means 28 and the illumination means 26 can be placed at will. The interior of the prism 23 is filled with fluid, preferably slightly salty water. The plane surface 23a of the half-sphere is sliding against the sample container holding means while this rotates passed the coupling means. In the bottom of the prism 23, a hole 23b allows for controlled leakage of the fluid from inside the half-sphere. The fluid from inside the half-sphere will act as a lubricant to reduce friction between the coupling means and the sample container holding means, while at the same time accomplishing optical contact. The hole is made sufficiently large in order for the light from the illumination means to enter and the light viewed by the detection means to pass through the liquid part.

Figure 3:
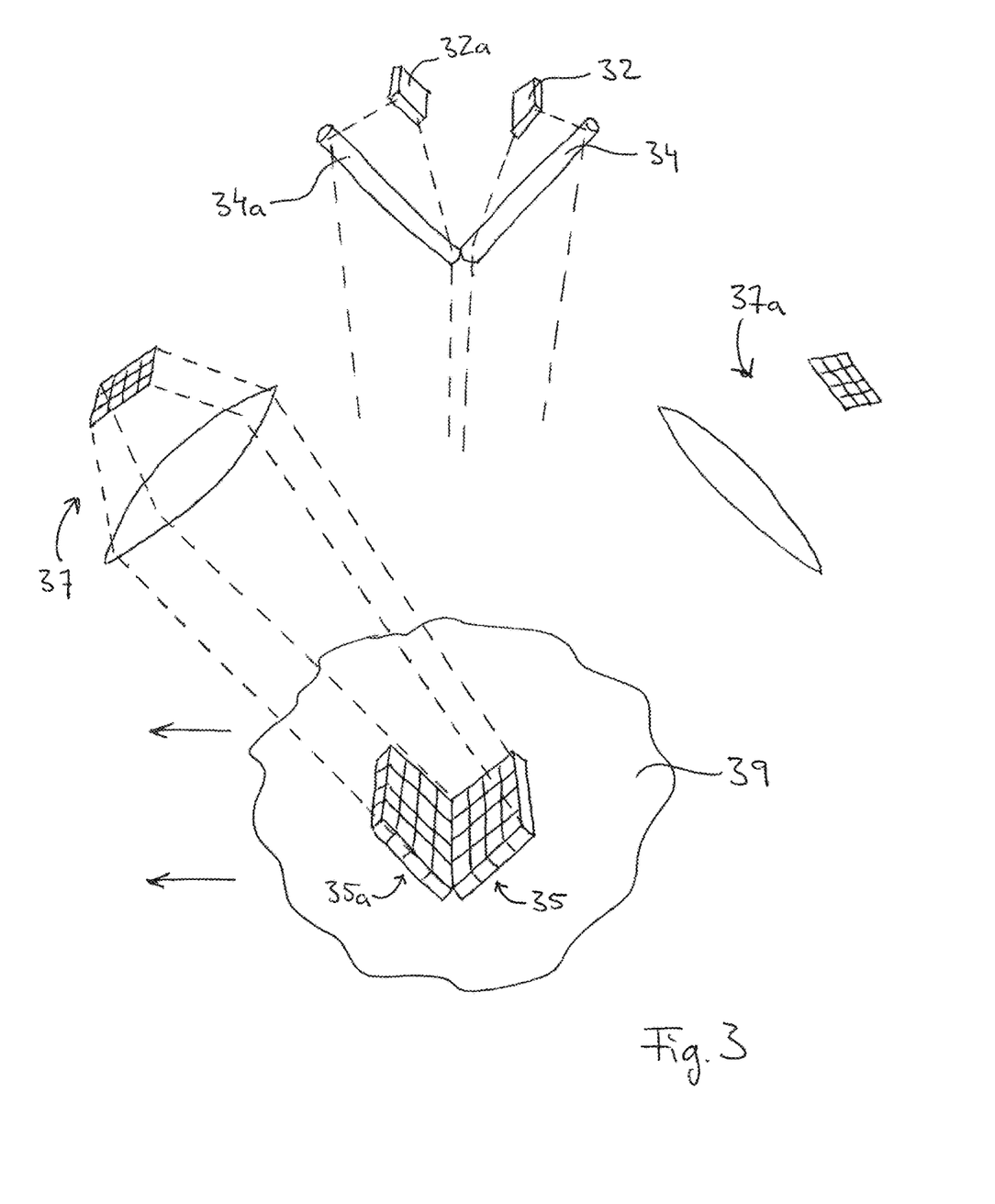
FIG. 3 schematically illustrates how illumination and detection cooperatively define an observation volume in accordance with the present invention.

Reference will now be made to FIG. 3. Another goal of the invention is to reduce the overall cost of apparatus, and in this respect it is beneficial to choose diode lasers 32 as the source in the illumination means. In a preferred embodiment of the invention, the illumination means comprises a high power diode laser with associated drivers and pulse generators, and focusing means 34 designed to generate a line focus. The line focus serves to illuminate a plane preferably perpendicular to the axis of the field of view of the detection means 37 and intersecting with the focal plane of the same detection means. When these conditions are met, the focal plane of the detection means 37 coincides with the illumination plane to define an observation plane 35. This means that a maximum number of voxels (illustrated in the Figure as "boxes" of the observation plane 35) are illuminated and observed under optimal conditions. For simplicity purposes, this plane is defined as the observation plane. The line focus is preferably accomplished using a cylindrical lens or an optical fiber 34. In order to not overly complicate the Figure and thereby risking to reduce its intelligibility, dashed trace lines are only included for one of the detection means/ observation planes, as well as only partly for the illumination means.

As mentioned above, diode lasers are preferred from a cost point of view. However, diode lasers are not ideal from a spatial coherences stand point. Especially those with high output power are often spatially multimode and this will affect the possible resolution in the dimension defined by the illumination. In another embodiment of the invention, a second detection means 37a is introduced having an axis of the field of view that is preferably perpendicular but at least significantly non-parallel to the axis of the first detection means. Also a second illumination means 32a is introduced, preferably with a line focus using a cylindrical lens or optical fiber 34a. The focal plane of said second illumination/exiting light and the focal plane of the objective lens are intersecting and the axes of said second illumination/exciting light and said second detection means, are chosen to be preferably orthogonal but at least significantly non parallel. This enables a configuration where the same volume in the sample 39, due to the motion (schematically illustrated by left-pointing arrows in FIG. 3) of the sample, will pass first through the observation plane 35 defined by the first detection means 37 and the first illumination means 32, 34, and then at a later point in time pass through the observation plane 35a defined by the second detection means 37a and the second illumination means 32a, 34a. By correlating the images generated by said two observation planes 35 and 35a, the uncertainty in position in one dimension due to multimode behavior of the laser source can be compensated by the better accuracy in position by the other observation plane in that same dimension. This embodiment thus enables the use of low cost lasers while still obtaining close to diffraction limited resolving power. Another advantage of this embodiment is that it increases the effective area of the illumination plane since relaxing the requirement of a narrow focal width enables a larger focal depth and thus a larger useful illuminated area.

In many applications a high throughput or frame rate is very desirable, e.g. in screening applications or when the dynamics of biochemical reactions are studied. The present invention contributes in at least two ways to this end. Since the invention removes the need for a pinhole, it is possible to parallelize the detection of, i.e. to simultaneously view (detect signals from), several points in the illumination plane, as defined above. The resulting throughput, measured in voxels per second, will thus be the degree of parallelization, measured in number of voxels that can be viewed in parallel, times the number of voxels passing the illumination plane per second. The throughput can thus be increased by either increasing the rotation speed or by increasing the parallelization.

One targeted application of the present invention is to be able to study the biochemistry of living cells. Since living cells are extremely complex systems it is a very challenging task to discern specific events, such as a specific proteinprotein interaction. In order to make such events visible, the proteins under interest are marked with fluorophores that emit light at a specific wavelength when excited by light at another wavelength. By using filters that allow only a specific wavelength or wavelengths to reach the detector, the image produced by the microscope is made up from the fluorescent light instead of the original exciting light. Thus only the marked proteins show up in the image.

Ideally, a fluorophore should be able to be excited and fluoresce an infinite number of times. Unfortunately, the excitation of a fluorophore does not always end up in emission of the desired fluorescence. With some likelihood, the excited molecule instead ends up in a dark state (e.g. the so called triplet state), which disables or radically slows down the return of the molecules to the ground state (so called photobleaching). The transition to the triplet state also renders the molecule toxic to its environment. In order to avoid photobleaching and toxicity it is thus highly preferred to hold the excitation of fluorophores to a minimum. At the same time the amount of fluorescent light in real applications is usually very low. This puts very high demands on the optics, detectors and the signal processing of the detection means. An important parameter in this regard is the so called dwell time. The dwell time is defined as the time that the same part of a sample (specimen) "dwells" within an illuminated voxel. In order to get a high signal-to-noise ratio it is desirable that the dwell time of the instrument exceeds the lifetime of the fluorophore with at least an order of magnitude. This way the fluorophore can be excited and fluoresce many times during the integration time of the detection means.

The present invention makes it possible to strike the balance between minimizing the photobleaching, have a large enough dwell time to ensure a sufficient signal-to-noise ratio, and maintain a high throughput. Since the observation volume is partly defined by the illumination, fluorophores are only excited when being observed. This minimizes the photobleaching. By adjusting the speed of rotation, the dwell time can be adjusted to obtain a good signal-to-noise ratio. And by increasing the parallelization, (the number of points observed in parallel by the detection means), high throughput can be maintained at moderate rotation rates.

In a simplified description, the detection means used in embodiments of the invention comprises an imaging means, an optional image transporting means, an optional wavelength filtering means, a detector, here short for means that detect optical signals and converts them to electrical signals, an optional amplifying means, and finally means to process, present, and store the signals corresponding to the captured image. The imaging means, either reflective or refractive, creates an image of the intensity distribution of the focal plane in an image plane. Along the path through the imaging means a filter may be introduced to remove unwanted wavelengths. One end of the optional image transporting means, which could be a bundle of optical fibers, is placed in the image plane, and transports the intensity distribution of said plane to the other end of the image transporting means, where the detector is placed. After conversion of the intensity distribution to an electrical representation, these signals are, if necessary, amplified before being processed, displayed or stored.

In one implementation of the detection means, the imaging means comprises an objective lens with a high numerical aperture, and a second lens that creates a mirror image of the intensity distribution of the observation plane, in the image plane. As an image transporting means, a fiber bundle is preferably used. The front end of the fiber bundle is placed in the image plane and arranged such that each voxel in the observation plane is imaged on a single fiber in the fiber bundle. Preferably, fibers having a high N.A and large cores compared to their claddings are used in order to minimize the crosstalk between voxels and to minimize the losses. The fibers in the bundle are then separated and each fiber is connected to a detector. In a preferred embodiment, these detectors are avalanche photo detectors (APDs) run in so called Geiger mode, i.e. APDs operated with a reverse voltage above the APD's breakdown voltage. An advantage of this type of detector is that it has a very high internal gain and is thus suitable for applications involving sparse photons.

In another embodiment, the back end of the fiber bundle is imaged on a detector array. This reduces the cost per voxel but detector arrays with APDs operating in Geiger mode is not yet a mature technology due to dark counts and afterpulsing.

In yet another embodiment the fibers in the fiber bundle all have different lengths. Several fibers may then be connected to the same single detector, again preferably in Geiger mode. Light from two different voxels that was emitted simultaneously thus arrives at different times on the detector. The smallest allowed difference in length between two fibers is determined by the bandwidth of the detector and the subsequent signal processing. The smallest length difference is preferably chosen such that the detector and associated signal processing just barely is able to distinguish between the two voxels corresponding to the smallest length difference. In this embodiment the exciting light from the illumination means comprises short pulses that are emitted with a time delay exceeding longest delay difference between any two fibers. An advantage of this embodiment is that the numbers of detectors can be reduced without reducing the degree of parallelization and thus the number voxels per second. This in turn reduces the cost of the method and apparatus.

As mentioned earlier, in a preferred embodiment the detector is an APD operating in Geiger mode. This is a very conscious choice and especially useful when fluorescence markers are used to accomplish specificity (sensitivity). In such applications, the compound likelihood that a photon from a fluorophore within a voxel is detected is rather small. A way to increase this likelihood is to increase the dwell time, i.e. the time that the fluorophore dwells within an illuminated voxel. This way the fluorophore can be excited and fluoresce an increased number of times and thus the likelihood to detect a photon increases. However, as also discussed above, increasing the dwell time reduces the throughput and although this can be compensated for by increasing the degree of parallelization there is a limit to this approach. Increasing the dwell time also means increasing the integration time of the detection means, which means that we are increasing the dark counts of the detector including the amplifier stage. In fact the noise level increases linearly with the integration time. An APD in Geiger mode has a very large internal amplification (often more than ten to the power of 6) and this means that even single photons give rise to a strong signal. In preferred embodiments, the dwell time is chosen to be about 100 ns. The likelihood of one photon being emitted during this time about one. Since it is known within less than 100 ns when the photon will arrive, the integration time only needs to be of that order. Thus the integrated noise will be relatively low. In a spinning disc with a frame rate of 1 kHz, the integration time needs to be 10000 times longer with a much lower amplification, pinhole cross talk, etc. Thus, in applications optimized for high throughput and/or low light levels, the approach using means for detection in the form of a detector run in Geiger mode is very useful.

Another goal of the invention is to keep the workflow simple when using the method or apparatus. The imaging of a sample is typically only one step of many in an assay. In most assays, prior to imaging, the sample has passed a number of preparation procedures, such as amplification, precipitation, washing, etc. In industrial applications such assays are automated procedures using plates, dishes, microarrays, or some other type of sample containing means, to effectively confine and transport the samples through parts the process. Said sample containers often comprise a large number of systematically arranged wells to be able to test many targets (analytes) and reagents in a multitude of combinations. In many laboratories there is a large installed base of equipment that cater for the automation of the assays and it is thus an advantage if the sample containers used in embodiments of the present invention adhere to these standard procedures. To this end, in one embodiment of the invention, the samples are placed on a planar or plate-like means, said means being of a material or combination of materials and with appropriate dimensions to be flexible enough to be attached on a rotation generating means such that it follows it curvature or shape of the sample container holding means. In this way the sample container can be made compatible with standard preparation procedures when in planar form and then assume the shape of the sample container holding means to comply with the intentions of the present invention.

Another significant advantage of the present invention is that it takes a snapshot, an on-the-spot record, of the intensity from a voxel or set of voxels in the observation volume. Unlike the current state of the art there is no need to record a temporal profile of the intensity while the sample is in the observation volume. This means that the speed with which a sample passes the observation volume can be made orders of magnitude higher than what has been possible to date. Typically the rotation rate will be in the order of 100 revolutions per second and the speed of the sample passing the observation volume in the order of a few meters to tens of meters per second. By moving the sample volume through the observation volume at high speeds, typically 10 m/s, embodiments of the invention hence enables screening of a large sample volume compared to the current state of the art, e.g. conventional confocal microscopy.

An additional advantage of embodiments of the present invention is that no pattern recognition algorithm is required for receiving or analyzing the detected signal. Since the position of each voxel is known as a function of time and the intensity of the light from each voxel is detected momentarily, the data generated represents a high resolution three-dimensional map of the whole volume that has passed through the observation volume.

The high precision of the rotation where the same volume may be observed turn after turn enables consecutive observation of the motion (at least statistically) of the particles in the cell or in a solution. The motion could be due either random walk, due to the centripetal forces or due to an applied electrical field. Very important information about the sample or specimen can be deduced from the motion data and in particular from the lack of motion.

What is claimed is:

1. An apparatus for imaging a sample, said apparatus comprising an illuminator for illuminating said sample, a detector for detecting photons emitted or scattered from said sample, a sample container holder having a longitudinal axis and an outward facing lateral surface extending around the longitudinal axis, and a sample container for holding said sample, wherein said illuminator and said detector are provided facing the outward facing lateral surface of said sample container holder, wherein:

an observation volume in the sample container on the outward facing lateral surface of the sample container holder, from which photons are emitted or scattered during imaging, is defined by a volume in space where light from the illuminator and a field of view of the detector overlap; and the sample container holder being configured to, during imaging, hold the sample container on the outward facing lateral surface of the sample container holder, and wherein the sample container holder is rotatably arranged around the longitudinal axis such that at least a portion of said sample can be transported through said observation volume, during imaging, by rotational motion of said sample container holder around the longitudinal axis.

2. The apparatus according to claim 1, wherein the detector comprises a Geiger mode avalanche photo detector.

3. The apparatus according to claim 1, further comprising an air bearing for suspending the sample container.

4. The apparatus according to claim 1, wherein the sample container is a plate-like sample container that can be bent to a radius to fit the outward facing lateral surface of the sample container holder and be attached thereto.

5. The apparatus according to claim 1, comprising at least two illuminators and detectors for defining at least two observation volumes, wherein the sample container is rotatably arranged such that at least a portion of said sample can be transported through said two observation volumes at separate points in time.

6. The apparatus according to claim 1, wherein said sample container comprises a plate-like sample container provided with grooves, wells or ridges for holding the sample, and a lid in the form of a thin plate or film covering said grooves, wells or ridges in order to contain the sample therein.

7. The apparatus according to claim 6, wherein said lid has a refractive index n wherein $n \approx 1.33$.

8. The apparatus according to claim 1, further comprising a lid, wherein said apparatus is arranged such that during rotation of the sample container, the sample is secured in the sample container due to centrifugal forces holding the sample against the lid.

9. The apparatus according to claim 8, further comprising a coupler in optical contact with the sample container at a first side, and having a curved surface at a second side for reducing reflections of photons entering or exiting the coupler.

10. The apparatus according to claim 9, wherein said illuminator and said detector are stationary relative to said coupler, and wherein said sample container is rotatably arranged in relation to said coupler.

11. The apparatus according to claim 10, wherein said coupler comprises a cavity for holding a liquid, and wherein the first side in optical contact with the sample container has an opening through which liquid may leak out from the cavity in order to provide lubrication, improved optical contact between the coupler and the sample container, or a combination thereof.

12. The apparatus according to claim 1, wherein said detector comprises at least two optical fibers of different lengths coupled to a common detector, such that photons from at least two different voxels can be detected in succession using the common detector.

13. The apparatus according to claim 1, wherein the sample container is rotatably arranged such that each sample can be repeatedly transported through the observation volume a plurality of times during rotation of the sample container.

14. A method of imaging a sample by the apparatus according to claim 1, comprising: defining the observation volume, from which photons are emitted or scattered during imaging, by a volume where light from the illuminator and a field of view of the detector overlap on the outward facing lateral surface of the sample container holder; and transporting the sample through the observation volume during imaging by rotation of the sample container holder holding the sample container, which in turn holds the sample, around the longitudinal axis.

15. The method of claim 14, wherein a detection is performed using an avalanche photo detector running in Geiger mode.

16. The method of claim 15, wherein a central axes of said light from the illuminator and said field of view of the detector are non-parallel.

17. The method of claim 14, wherein the sample container is suspended by an air bearing.

18. The method of claim 14, further comprising holding the sample in the sample container, wherein the sample container is a plate-like sample container that is bent to a radius to fit the outward facing lateral surface of the sample container holder, and attaching the sample container to the sample container holder.

19. The method according to claim 14, wherein at least two observation volumes are defined, and wherein the sample is transported through said at least two observation volumes in succession.

20. The method according to claim 14, wherein the sample is transported through each observation volume by rotation, whereby the sample is imaged repeatedly during said rotation.

21. The method according to claim 14, wherein a time resolved imaging is performed by comparing detected signals from at least two passages of the sample through the observation volume.

22. The method according to claim 14, wherein the sample is marked using a fluorophore and imaging is performed by detecting fluorescence from said fluorophore.

23. The method according to claim 14, wherein the sample contains one or more living cells.

24. The apparatus according to claim 1, wherein a central axes of said light from the illuminator and said field of view of the detector are non-parallel.

25. The apparatus according to claim 1, wherein the outward facing lateral surface faces a direction substantially perpendicular to the longitudinal axis.

* * * * *